United States Patent [19]
Kim

[11] Patent Number: 5,920,308
[45] Date of Patent: Jul. 6, 1999

[54] KEYBOARD WITH A WIRELESS REMOTE CONTROL RECEIVER AND A METHOD OF REDEFINING A KEY FUNCTION FOR REMOTE CONTROL

[75] Inventor: Kwan-Wook Kim, Suwon, Rep. of Korea

[73] Assignee: SamSung Electronics Co., Ltd., Suwon, Japan

[21] Appl. No.: 08/738,645

[22] Filed: Oct. 30, 1996

[30]  Foreign Application Priority Data

Oct. 30, 1995 [KR] Rep. of Korea ........................ 95/38057
Oct. 1, 1996 [KR] Rep. of Korea ........................ 96/43514

[51] Int. Cl.[6] ...................................................... G06F 3/033
[52] U.S. Cl. .............................. 345/169; 345/168; 341/22
[58] Field of Search ..................................... 345/169, 168, 345/156; 341/22, 23; 400/472, 474

[56]  References Cited

U.S. PATENT DOCUMENTS

| | | | |
|---|---|---|---|
| 4,208,081 | 6/1980 | Kekas et al. | 439/374 |
| 4,232,299 | 11/1980 | Eisenberg | 340/825.72 |
| 4,609,792 | 9/1986 | Levasseur | 200/5 A |
| 4,875,043 | 10/1989 | Gisoni et al. | 341/22 |
| 5,151,051 | 9/1992 | Tanaka et al. | 345/168 |
| 5,151,696 | 9/1992 | Kasahara et al. | 341/22 |
| 5,307,297 | 4/1994 | Iguchi et al. | 345/169 |
| 5,440,502 | 8/1995 | Register | 345/168 |
| 5,530,893 | 6/1996 | Sugi | 395/825 |
| 5,689,253 | 11/1997 | Hargreaves et al. | 341/22 |
| 5,708,458 | 1/1998 | Vrbanac | 345/169 |
| 5,793,359 | 8/1998 | Ushikubo | 345/169 |

*Primary Examiner*—Edward Lefkowitz
*Assistant Examiner*—Davetta Woods
*Attorney, Agent, or Firm*—Robert E. Bushnell, Esq.

[57]  ABSTRACT

A keyboard for a personal computer system has a remote control function. The personal computer system has a keyboard unit for communicating with a main computer unit by using signal lines connected therebetween and generating a re-send signal when a communication request signal for remote control is provided from the main computer unit. A communication control section controls a communication of the keyboard unit with the main computer unit in response to the control signal, so as to allow the remote control receiver to receive information for redefining of a key function for the remote control. The keyboard can redefine a key function for remote control in accordance with several sorts of programs.

20 Claims, 5 Drawing Sheets

KEYBOARD WITH A WIRELESS REMOTE CONTROL RECEIVER AND A METHOD OF REDEFINING A KEY FUNCTION FOR REMOTE CONTROL

CLAIM OF PRIORITY

This application makes claims all benefits accruing under 35 U.S.C. §119 from an application for *A Keyboard With A Wireless Remote Control Receiver And A Method Of Redefining A Key Function For Remote Control* earlier filed in the Korean Industrial Property Office on the 30th of Oct. 1995 and there duly assigned Ser. No. 38057/1995, and for *Keyboard With A Wireless Remote Control Receiver And A Method Of Redefining A Key Function For Remote Control* earlier filed in the Korean Industrial Property Office on the 1st of Oct. 1996 and there duly assigned Ser. No. 43514/1996.

FIELD OF THE INVENTION

The present invention is generally directed to a keyboard of a personal computer system. More particularly, this invention relates to a keyboard that permits a bidirectional communication between the keyboard and a main computer body of a personal computer system disposed to use a wireless remote control receiver.

BACKGROUND OF THE INVENTION

In a typical desktop personal computer, a main computer body (hereinafter, referred to as "computer unit"), in which a CPU (central processing unit) is mounted, and a keyboard are separated from each other. In most of personal computers having such a separable keyboard, data are serially transmitted between the computer unit and a keyboard unit. The data can be transmitted from the keyboard unit to the computer unit. In some personal computers, the keyboard unit uses a wireless remote control receiver to receive information to the computer unit.

From my study of such personal computers, I find that there is a need for an effective keyboard unit with a wireless remote control receiver that permits re-programming of key functions. Exemplars of the contemporary practice include Gisoni et al. (U.S. Pat. No. 4,875,043, *Bi-directional Keyboard Interface Circuit*, Oct. 17, 1989) teaching a keyboard encoder which encodes a key selected by an operator. Levasseur (U.S. Pat. No. 4,609,792, *Encoding Keyboard*, Sep. 2, 1986) discusses an encoding keyboard. Eisenberg (U.S. Pat. No. 4,232,299, *Wireless Output/Input System*, Nov. 4, 1980) teaches a system for entering information into an electronic system from a remote location. Kekas et al. (U.S. Pat. No. 4,208,081, *Easily Reconfigurable Data Entry Terminal*, Jun. 17, 1980) teaches a data entry terminal that permits more than one configuration. These exemplars give evidence that there is a need for an effective keyboard unit with a wireless remote control receiver that permits re-programming of key functions, especially if such a keyboard has a communication control that permits interception of communications with a main computer unit.

SUMMARY OF THE INVENTION

It is therefore an object of the present invention to provide an improved keyboard of a personal computer system.

It is another object of the present invention to provide an improved keyboard that permits a bidirectional communication between the keyboard and a main computer body of a personal computer system disposed to use a wireless remote control receiver.

It is another object of the present invention to provide a keyboard with a remote control receiver in which information can be transmitted from a main computer unit of a personal computer to the remote control receiver, so as to allow for redefining a key function for remote control.

It is another object of the present invention to provide a method of redefining a key function for remote control of a keyboard with a remote control receiver.

It is another object of the present invention to provided a keyboard with a remote control receiver in which a key function for remote control can be redefined in accordance with several sorts of programs.

It is another object of the present invention to provided a method of redefining a key function in a keyboard with a remote control receiver in which the key function for remote control can be redefined in accordance with several sorts of programs.

To accomplish one or more of the above objects, there is provided a keyboard with a remote control function including a keyboard unit for communicating with a main computer unit by using signal lines connected therebetween and for generating a re-send signal when a communication request signal for remote control is provided from the main computer unit. A remote control receiver detects the re-send signal to generate a control signal. In response to the control signal, a communication control section controls a communication of the keyboard unit with the main computer unit through the signal lines, so as to allow the remote control receiver to receive information for redefining a key function for remote control from the main computer unit.

To accomplish one or more of the above objects, there is provided a keyboard having communication control section. The communication control section includes a data control portion and a clock control portion which are located on separate signal lines. The data and clock control portions are provided to enable corresponding signal lines to be activated or inactivated in response to the control signal.

To accomplish one or more of the above objects, there is provided a keyboard with a data control portion and a clock control portion. Each of the control portions (data and clock control portions) includes two load resistors connected in parallel on a corresponding signal line and supplied with a source voltage. The control portions further include: a first inverter has an input terminal receiving a data signal from the keyboard unit; a first NAND gate having two input terminals, one of which receives output of the first inverter and the other receives the control signal; a second inverter having an input terminal receiving output of the first NAND gate; and a second NAND gate having two input terminals, one of which receives output of the second inverter and the other receives the control signal.

To accomplish one or more of the above objects, there is provided a method of redefining a key function for remote control in a keyboard with a remote control function. The method includes the steps of generating a communication request signal for remote control from a main computer unit during a communication of a keyboard unit of with the computer unit. Then, a re-send signal is generated from the keyboard unit in response to the request signal. Upon detecting the re-send signal from the keyboard unit to the computer unit, control signals are generated. The method further includes the steps of intercepting a communication of the keyboard unit with the computer unit and allowing for a communication of a remote control receiver with the computer unit in response to the control signal.

To accomplish one or more of the above objects, there is provided a method of redefining the key function for remote control.

To accomplish one or more of the obove objects, there is provided a method of redefining the key function including the steps of checking whether a specific key-input from a remote control transmitter is applied through the remote control receiver to the computer unit and calling a remote control program in the computer unit in the presence of the specific key-input. The method further includes the steps of transmitting a key map to the computer unit in the absence of the specific key-input, checking whether a reset signal is inputted, setting a key map to an initial value in the absence of the reset signal, setting a new key map for the key function, and intercepting the communication of the receiver with the computer unit.

To accomplish one or more of the above objects, there is provided a method of setting a new key map including checking whether the new key map is set and calling a redefining program of the new key map when the new key map is set. The method further includes the steps of selecting a key map of previously defined key maps, transmitting the selected key map to the receiver when the new key map is not set, checking whether the selected key map is correct, and intercepting the communication of the receiver with the computer unit when the selected key map is correct.

These and other features, and advantages, will be more clearly understood from the following detailed description taken in conjunction with the accompanying drawings. It is important to point out that the illustrations may not necessarily be drawn to scale, and that there may be other embodiments of the present invention which are not specifically illustrated.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF PREFERRED EMBODIMENTS

Figure 1:
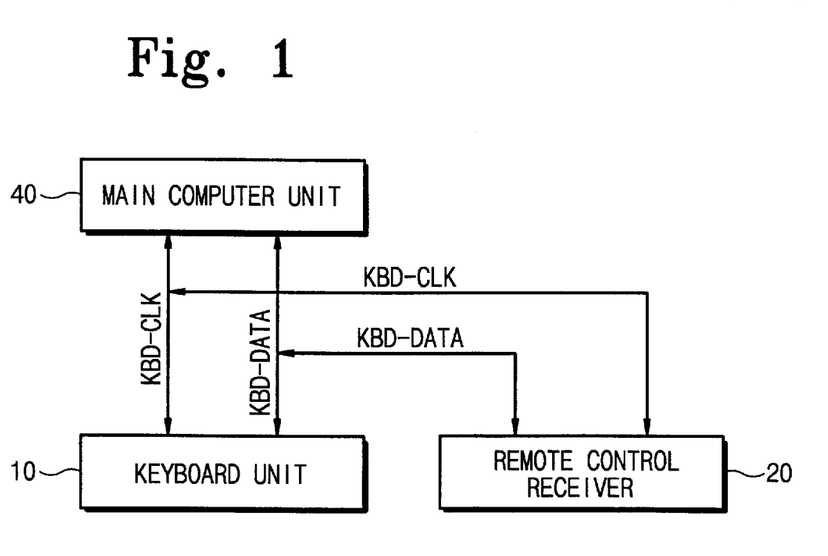
FIG. 1 is a block diagram illustrating a personal computer with a keyboard and a remote control receiver mounted according to a contemporary practice.

Turning now to the drawings, FIG. 1 illustrates a personal computer according to a contemporary practice. The personal computer has a keyboard unit 10 with a remote control receiver 20. The keyboard unit 10 can transmit "key information" through signal lines to the computer unit and can receive control information from the main computer unit 40.

By "key-information", one refers to data and a clock information. For each strike of a keypad, this key information is generated from the keyboard unit 10 and transmitted to the computer unit 40. Information can travel on the signal lines between the keyboard unit 10 and the main computer unit 40. One of the signal lines connected between the keyboard unit 10 and the computer unit is a data line KBD-DATA. The other signal line is a clock line KBD-CLK which is used to synchronize data on the data line KBD-DATA. These data and clock lines KBD-DATA and KBD-CLK are also connected to the remote control receiver 20. These connections to the remote control receiver 20 permit serial communication between the remote control receiver 20 and the main computer unit 40.

A user takes advantage of the communications between the units by using the keyboard unit 10. The keyboard unit 10 includes generally a key pad (not shown in FIG. 1) having a key matrix. on which a plurality of keys are located, for detecting a stroke of a specific key, and a processor (not shown in FIG. 1) for generating a key-scan code corresponding to the specific key. The key-scan code, along with a clock signal, is transmitted through the signal lines KBD-DATA and KBD-CLK to the main computer unit 40.

In the personal computer of FIG. 1, data can be transmitted from the keyboard unit 10 to the computer unit, or conversely. If a remote control signal from a remote control transmitter (not shown in FIG. 1) is applied to the remote control receiver 20 of the personal computer, the receiver 20 emulates the remote control signal and thus generates a key-scan code signal. This code signal is transmitted through the signal lines KBD-DATA and KBD-CLK to the main computer unit 40.

As stated in the previous paragraph, the key-scan code signal can be transmitted from the remote control receiver 20 to the main computer unit 40. In contrast, the remote control receiver 20 can not receive any information from the computer unit. For the personal computer of FIG. 1, the key functions cannot be changed. When a remote control transmitter (not shown in FIG. 1), suitable to the remote control receiver 20, is manufactured by a manufacturer, the key functions for the transmitter (not shown in FIG. 1) are set by the manufacturer. Thus, since a user can affect the personal commputer only through the key functions, which are preprogrammed by manufacturer, the user cannot program the key functions of the personal computer of FIG. 1 to other forms.

Figure 2:
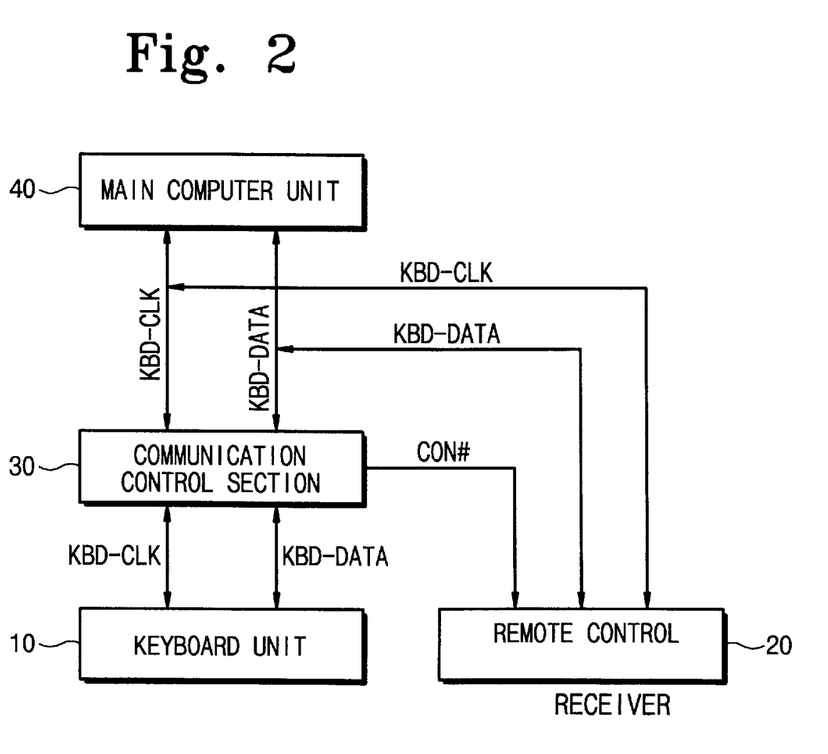
FIG. 2 is a block diagram illustrating another personal computer with a keyboard and a remote control receiver built according to the principles of the present invention.

The situation of a personal computer of FIG. 2 is different. A personal computer with a remote control function as illustrated in FIG. 2 has a remote control receiver 20 mounted thereon and a communication control section 30. In response to a re-send signal from the keyboard unit 10 to the main computer unit 40, the communication control section 30 intercepts a communication of a keyboard unit 10 with a main computer unit 40. The communication section 30 allows communication of the main computer unit 40 with the receiver 20. Thus, the keyboard can redefine a key function for remote control in accordance with several sorts of programs from the main computer unit 40.

As shown in FIG. 2, the personal computer of FIG. 2 has much of the same construction as that of FIG. 1 except that the communication control section 30 is coupled between the main computer unit 40 and the keyboard unit 10. The personal computer has the keyboard unit 10 with the remote control receiver 20. The keyboard unit 10 can transmit "key information" to the computer unit and can receive control information from the main computer unit 40. By "key information", one refers to data and a clock information. For each strike of a keypad, this key information is generated from the keyboard unit 10 and transmitted to the computer unit 40. Through connections with data and clock lines KBD-DATA and KBD-CLK, the main computer unit 40 is connected to the remote control receiver 20. These connections to the remote control receiver 20 permit serial communication between the remote control receiver 20 and the main computer unit 40.

A user takes advantage of the communications between the units by using the keyboard unit 10. The keyboard unit 10 includes generally a key pad (not shown in FIG. 1) having a key matrix, on which a plurality of keys are located, for detecting a stroke of a specific key, and a processor (not shown in FIG. 1) for generating a key-scan code corresponding to the specific key. The key-scan code, along with a clock signal, is transmitted to the main computer unit 40.

In the personal computer of FIG. 2, data can be transmitted from the keyboard unit 10 to the computer unit 40, or conversely. If a remote control signal from a remote control transmitter 50 (not shown in FIG. 1, shown in FIG. 4) is applied to the remote control receiver 20 of the personal computer, the receiver 20 emulates the remote control signal and thus generates a key-scan code signal. The transmitter 50 can have a keypad or a suitable data input unit. Along with this process involving the transmitter 50, the generated code signal is transmitted through the signal lines KBD-DATA and KBD-CLK to the main computer unit 40.

As stated in the previous paragraph, the key-scan code signal can be transmitted from the remote control receiver 20 to the main computer unit 40. Data can be transmitted from the keyboard unit 10 to the computer unit 40, or conversely. The communication control section 30 can intercept the communication of the keyboard unit 10 with the main computer unit 40 in response to a control signal from the keyboard unit 10. The remote control receiver 20 generates a control signal upon detecting a re-send signal from the keyboard unit 10 to the computer unit. The control signal is applied through a control line CON# to the control section 30. In this fashion, the control signal is used to intercept the communication of the keyboard unit 10 with the computer unit. The re-send signal is generated so as to handle the situation when the keyboard unit 10 does not recognize a communication request signal for remote control, i.e., a command signal for requesting a communication of the computer unit with the remote control receiver 20. If the remote control receiver 20 detects a re-send signal generated from the keyboard unit 10, the receiver 20 generates a control signal to be provided through the control line CON# to the communication control section 30. This section 30 then intercepts the communication of the keyboard unit 10 with the computer unit 40. From this time, the computer unit 40 can communicate with the remote control receiver 20 so as to redefine a key function for remote control of this personal computer.

Figure 3:
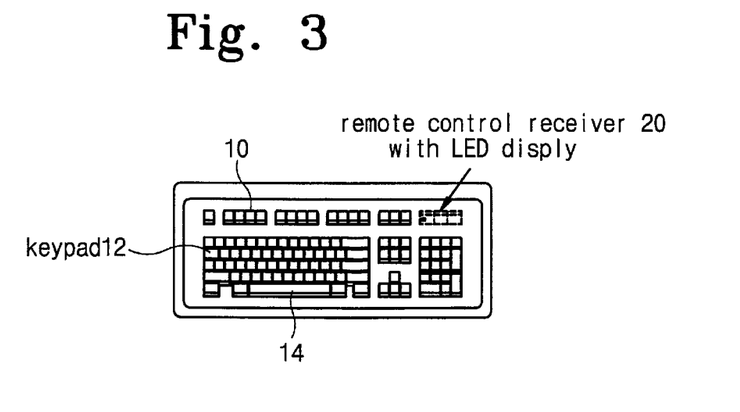
FIG. 3 is a plan view of the keyboard illustrated in FIG. 2, in which the remote control receiver is mounted on the front panel of the keyboard.

As shown in FIG. 3, this personal computer is provided with a front cover with a key pad 12 composed of a plurality of keys, including a space bar 14. As shown in FIG. 3, the remote control receiver 20 is located on the front cover, together with a light emitting diode (LED) display.

Figure 4:
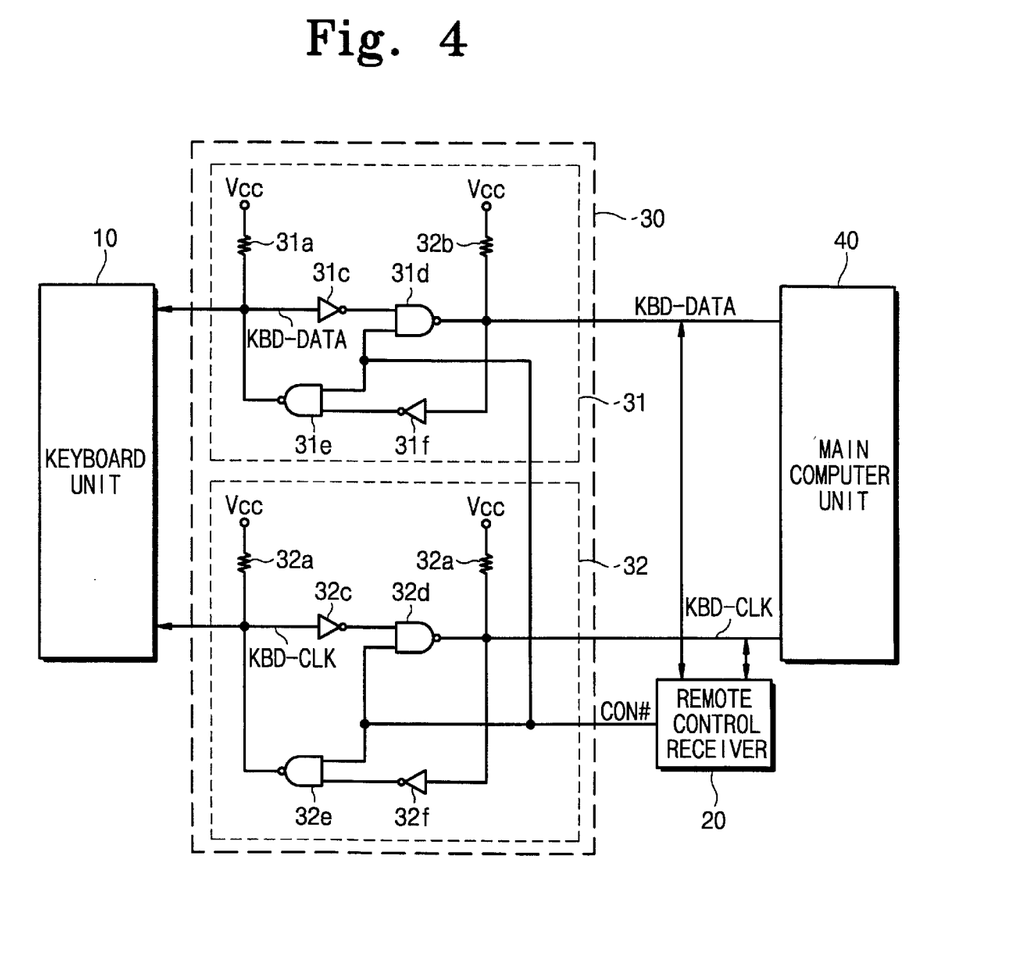
FIG. 4 is a circuit diagram of the personal computer shown in FIG. 2.

As shown in FIG. 4, the personal computer, controlled from this front cover, uses the communication control section 30. The communication control section 30 has a plurality of data control portion 31 and a clock control portion 32. The data control portion 31 and the clock control portion 32 have homologous circuit constructions and have analogous functions. The data control portion 31 is used to enable the data clock signal line KBD-DATA, among a plurality of data signal lines to be activated and to be inactivated. Analogously, the clock control portion 32 is used to enable the clock signal line KBD-CLK to be activated and inactivated.

The data control portion 31 includes two resistors 31a and 31b connected in parallel on the data signal line KBD-DATA. The two resistors 31a and 31b are supplied with a power source voltage Vcc. The data control portion 31 further includes an inverter 31c having an input terminal receiving a data signal from the keyboard unit 10 and an output terminal connected to a NAND gate 31d. The NAND gate 31d of data control portion 31 has an output terminal and two input terminals, one of which receives the output of the inverter 31c and the other which receives the control signal through the control signal line CON#. The data control portion 31 further includes an inverter 31f having an input terminal receiving the output of the NAND gate 31d and an output terminal connected to a NAND gate 31e. The NAND gate 31e of data control portion 31 has two input terminals, one of which receives the output of the inverter 31f and the other which receives the control signal through the control signal line CON#.

As stated previously, the clock control portion 32 is constructed in an homologous manner as the data control portion 31. The clock control portion 32 includes two resistors 32a and 32b connected in parallel on the clock signal line KBD-CLK. The two resistors 32a and 32b are supplied with a power source voltage Vcc. The clock control portion 32 further includes an inverter 32c having an input terminal receiving a data signal from the keyboard unit 10 and an output terminal connected to a NAND gate 32d. The NAND gate 32d of clock control portion 32 has an output terminal and two input terminals, one of which receives the output of the inverter 32c and the other which receives the control signal through the control signal line CON#. The data control portion 32 further includes an inverter 32f having an input terminal receiving the output of the NAND gate 32d and an output terminal connected to a NAND gate 32e. The NAND gate 32e of clock control portion 32 has two input terminals, one of which receives the output of the inverter 32f.

Turning again to FIG. 4, if a control signal of high level is generated from the remote control receiver 20, the keyboard unit 10 communicates with the main computer unit 40 by means of the data and clock control portions 31 and 32. While the control signal is at high level, the output data of the keyboard unit 10 can be applied through the data control portion 31 to the computer unit 40. For example, if the output data of high level is generated from the keyboard unit 10, the output data is changed to low level by means of the inverter 31c and applied to one input of the NAND gate 31d. In the NAND gate 31d, since one of its two inputs receives the control signal of high level, the output level of the NAND gate 31d is determined by the inverter 31c. The output of the NAND gate 31d is at the high level and is applied to the main computer unit 40. Instead of the previous situation of the output of high level, if a output data of low level is generated from the keyboard unit 10 when the control signal is of high level, the output data is changed to high level by means of the inverter 31c and applied to one input of the NAND gate 31d. Similarly, since one of two inputs of the NAND gate 31d receives the control signal of high level, the output of the NAND gate 31d is determined by the output of the inverter 31c. The output of the NAND gate 31d then is at low level, which is applied to the main computer unit 40.

In the analogous way as stated above, while the control signal is at high level, the clock signal from the keyboard unit 10 is applied through the clock control portion 32 to the main computer unit 40. While the control signal is at high level, the output data of the keyboard unit 10 can be applied through the clock control portion 32 to the computer unit 40. For example, if the output data of high level is generated from the keyboard unit 10, the output data is changed to low level by means of the inverter 32c and applied to one input of the NAND gate 32d. In the NAND gate 32d, since one of its two inputs receives the control signal of high level, the output level of the NAND gate 32d is determined by the inverter 32c. The output of the NAND gate 32d is at the high level and is applied to the main computer unit 40. Instead of the previous situation of an output data of high level, if an output data of low level is generated from the keyboard unit 10 when the control signal is of high level, the output data is changed to high level by means of the inverter 32c and applied to one input of the NAND gate 32d. Similarly, since one of two inputs of the NAND gate 32d receives the control signal of high level, the output of the NAND gate 32d is determined by the output of the inverter 32c. The output of the NAND gate 32d then is at low level, which is applied to the main computer unit 40.

In contrast to the situation of a control signal of high level, if a control signal of low level is generated from the remote control receiver 20, the keyboard unit 10 cannot communicate with the main computer unit 40 by means of the data and clock control portions 31 and 32. Then, the remote control receiver 20 can communicate with the main computer unit 40.

For example, if the output data of low level is generated from the keyboard unit 10, the output data is changed to high level by means of the inverter 31c and applied to one of the input terminals of the NAND gate 31d. In the NAND gate 31d, since one of the two input terminals receives the control signal of low level, the output terminal of the NAND gate 31d is always is at high level regardless of the output of the inverter 31c. Thus, the output of the NAND gate 31d always is at high level and is applied to the main computer unit 40. Instead of the previous situation of the output data level of low level, if the output data of high level is generated from the keyboard unit 10 during the generation of a control signal of low level, the output data is changed to low level by means of the inverter 31c and applied to one of the input terminals of the NAND gate 31d. However, since one of the two input terminals of the NAND gate 31d always receives the control signal of low level, the output of the NAND gate 31d always is at high level regardless of the output of the inverter 31c. Thus, the output of the NAND gate 31d is always at high level and is applied to the main computer unit 40. From this time, therefore, the keyboard unit 10 cannot communicate with the main computer unit 40. Then, the computer unit 40 can communicate with the remote control receiver 20 through the data and clock signal lines KBD-DATA and KBD-CLK.

Analogously, if the output data of low level is generated from the keyboard unit 10, the output data is changed to high level by means of the inverter 32c and applied to one of the input terminals of the NAND gate 32d. In the NAND gate 32d, since one of the two input terminals receives the control signal of low level, the output terminal of the NAND gate 32d is always is at high level regardless of the output of the inverter 32c. Thus, the output of the NAND gate 32d always is at high level and is applied to the main computer unit 40. Instead of the previous situation of the output data level of low level, if the output data of high level is generated from the keyboard unit 10 during the generation of a control signal of low level, the output data is changed to low level by means of the inverter 32c and applied to one of the input terminals of the NAND gate 32d. However, since one of the two input terminals of the NAND gate 32d always receives the control signal of low level, the output of the NAND gate 32d always is at high level regardless of the output of the inverter 32c. Thus, the output of the NAND gate 32d is always at high level and is applied to the main computer unit 40. From this time, therefore, the keyboard unit 10 cannot communicate with the main computer unit 40. Then, the computer unit 40 can communicate with the remote control receiver 20 through the data and clock signal lines KBD-DATA and KBD-CLK.

As described above, to redefine a key function for remote control, the data communication between the keyboard unit 10 and the computer unit 40 must be intercepted in response to a control signal from the remote control receiver 20. Upon this interception, the computer unit 40 must communicate with the remote control receiver 20.

Hereinafter, the operation of this personal computer, which includes the generation of the control signal will be described with reference to FIGS. 5 and 6.

Figure 5:
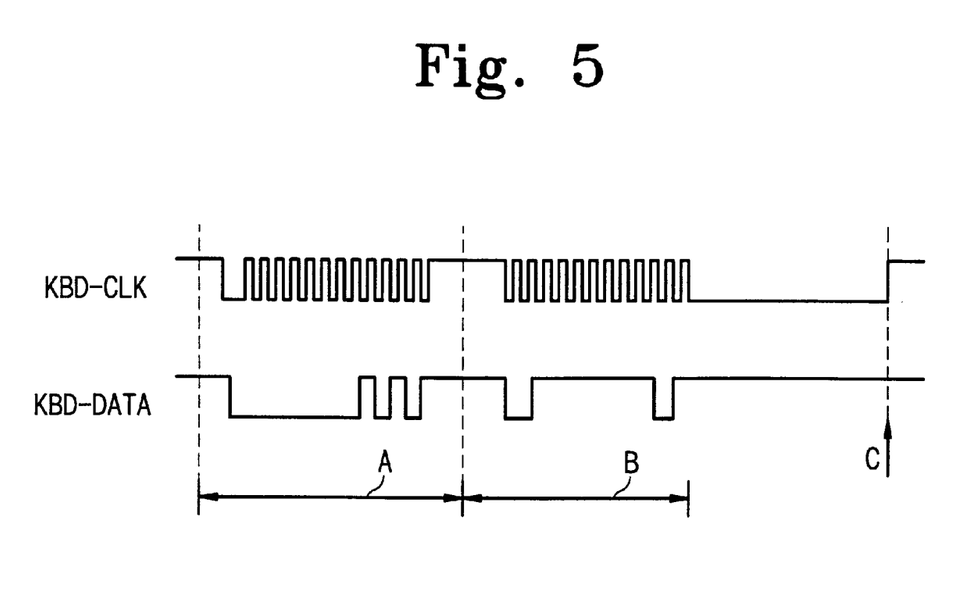
FIG. 5 is a timing chart showing the signal lines up to the point of a generation of a control signal from the keyboard illustrated in FIG. 2.

FIG. 5 shows the signal lines up to the point of generation of a control signal of low level. In FIG. 5, the Period A is the period of generating a request signal for remote control. The Period B is the period of generating a RE-SEND signal. The Point C is the point of generation of a control signal of low level. As described above, when a control signal of low level is generated, then the signal lines are at high level.

Figure 6:
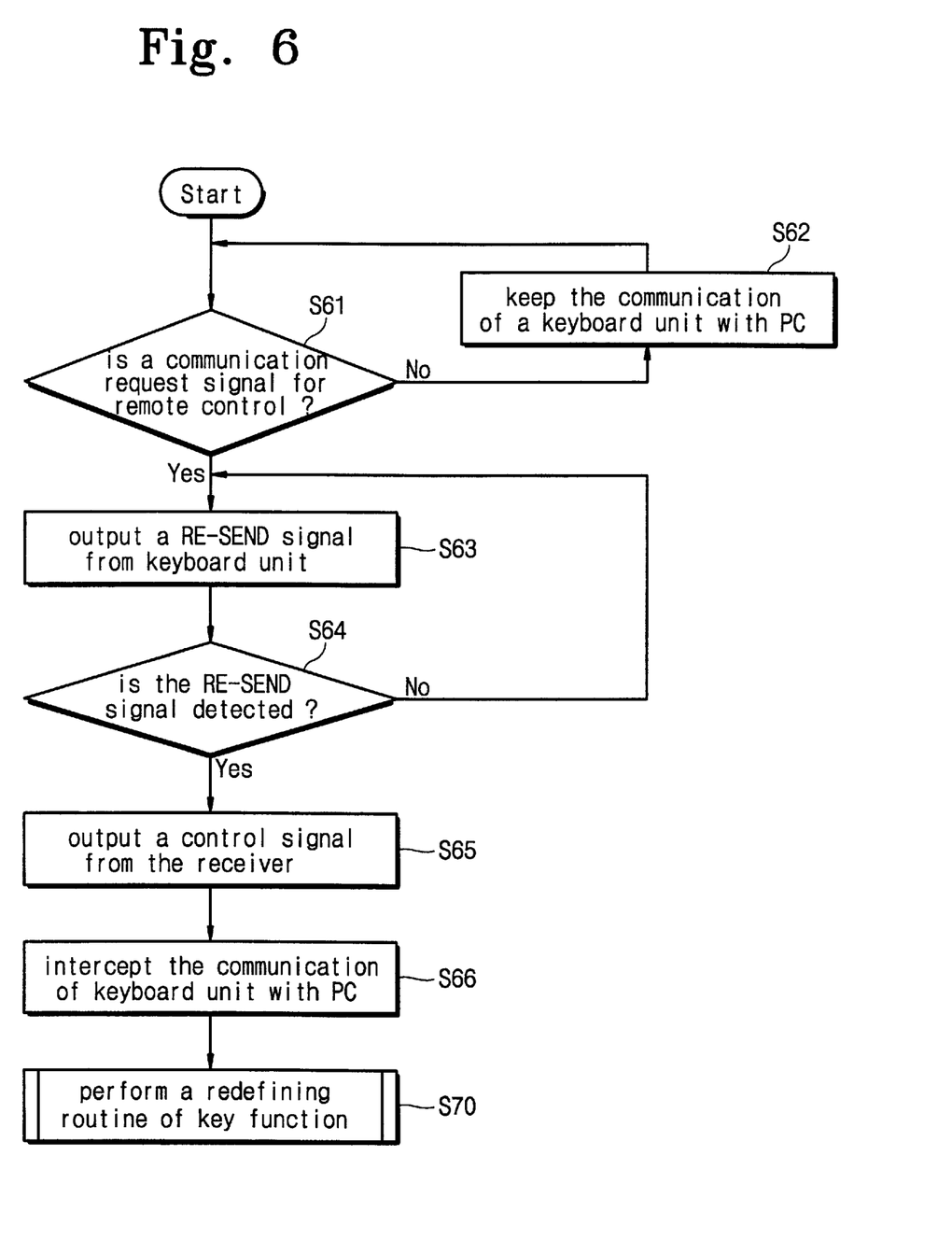
FIGS. 6 and 7 are flow charts showing the steps of redefining a key function in accordance with a method according to the principles of the present invention.

FIG. 6 showing steps of redefining a key function in accordance with a method according to the principles of the present invention. First, at step S61 of FIG. 6, if a communication request signal for remote control is generated from the computer unit 40 during the communication of the keyboard unit 10 with the computer unit 40, the control proceeds to step S63. In contrast, if a communication request signal for remote control is not generated from the computer unit 40 during the communication of the keyboard unit 10 with the computer unit 40, the control proceeds to step S62 instead of step S63. At step S63, the keyboard unit 10 generates a re-send signal, which is applied through the signal line KBD-DATA to the computer unit 40. The re-send signal is generated in case that the keyboard unit 10 cannot recognize the communication request signal. This sequence of steps in generation of a re-send signal is illustrated in FIG. 5.

During the generation of the re-send signal, if the remote control receiver 20 detects the re-send signal (step S64), the remote control receiver 20 generates a control signal of low level (step S65). As a result, the communication of the keyboard unit 10 with the computer unit 40 is intercepted (step S66). Thus, the receiver 20 can begin to communicate with the computer unit 40 so as to redefine a key function for remote control (step S70) until a command signal for intercepting the communication is applied from the computer unit 40. This redefining a key function until a command signal for intercepting the communcation from the computer unit 40 is further illustrated in FIG. 7.

Hereinafter, a method of redefining a key function for remote control will be described with reference to FIG. 7.

Figure 7:
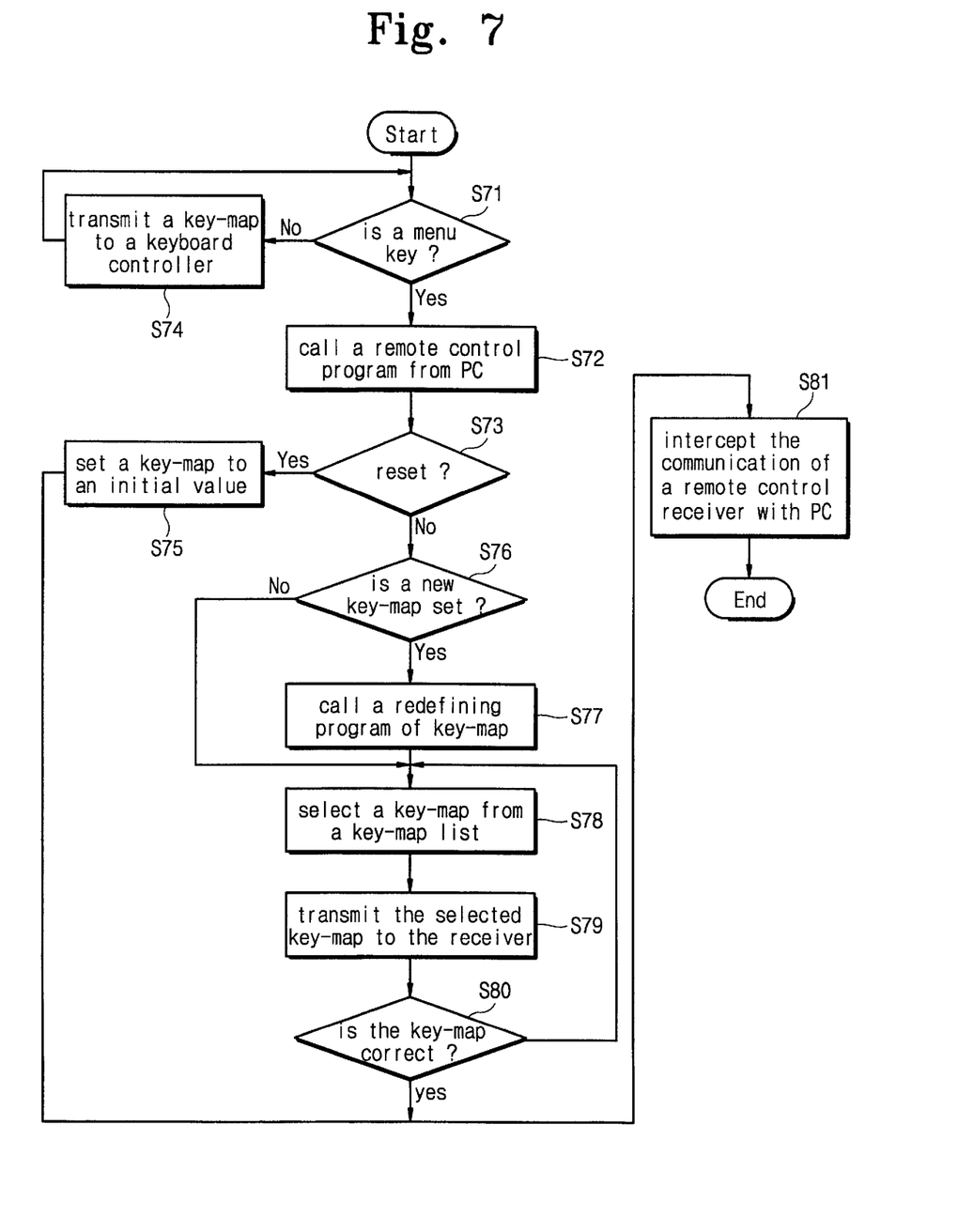

Referring to FIG. 7, at step S71, it is checked whether a menu-key input from a remote control transmitter 50 is applied through the remote control receiver 20 to the computer unit 40. If the menu-key input is applied, then at step S72, the computer unit 40 calls a remote control program. If not, the control proceeds to step S74 to transmit a key-map to a keyboard controller (not shown) in the computer unit 40.

During the call of the remote control program, it is checked at step S73 whether a reset signal from the transmitter 50 is inputted. If a reset signal from the trasmitter is inputted, the key map is set to an initial value (step S75) and the control proceeds to step S81. At step S81, the communication of the remote control receiver 20 with the computer unit 40 is intercepted and a communication between the keyboard unit 10 and the computer unit 40 is again started.

In contrast to the previously mentioned situation, if the reset signal is not inputted, it is checked that a new key map is to be set (step S76). If a new key map is to be set, the control proceeds to step S77 to call a redefining program of key map before proceeding to step S78. If a new key map is not to be set, then the control directly proceeds to step S78. At step S78, a key map is selected among the previously defined key maps by a user. The selected key map is provided to the remote control receiver 20 (step S79). In an altenative embodiment, the selected key map is provided to the remote control receiver 20 only if a new key map is not set. Then, at step S80, it is checked whether the selected key map is correct. If the selected key map is inappropriate, the control proceeds to step S78 to select a key map again. If the selected key map is correct, the control proceeds to step S81 to intercept the communication of the remote control receiver 20 with the computer unit 40. Then, the redefining method of a key function for remote control is terminated.

As described above, with the keyboard according to the present invention, it is possible to interrupt the communication of a keyboard unit with a main computer unit 40 and communicate the computer unit 40 with a remote control receiver 20, so as to redefine a key function for remote control. Therefore, by using the keyboard of the present invention, a key function for remote control can be redefined either in accordance with several sorts of programs which are previously defined in the computer unit 40 or in accordance with user-defined programs.

In the drawings and specification. there have been disclosed typical preferred embodiments of the invention and, although specific terms are employed, they are used in a generic and descriptive sense only and not for purposes of limitation, the scope of the invention being set forth in the following claims.

What is claimed is:

1. A personal computer system with a remote control function, comprising:

a main computer unit;

a keyboard unit disposed to communicate with said main computer unit by using first and second signal lines, said keyboard unit generating a re-send signal when a communication request signal for remote control is provided from said main computer unit;

a remote control receiver disposed to detect the re-send signal, said remote control receiver generating a control signal upon a detection of the re-send signal; and a communication control section disposed to control a communication of said keyboard unit with said main computer unit through said first and second signal lines, said communication control section blocking the communication of said keyboard unit with said main computer unit in response to the control signal to allow said remote control receiver to receive information for redefining a key function for remote control from said main computer unit, said communication control section comprising:

a data control portion electrically connected to shift said first signal line between electrically activated and electrically inactivated states, said data control portion controlling said first signal line in response to the control signal, said data control portion comprising:

first and second load resistors connected in parallel on said first signal line and supplied with a first source voltage, a first inverter having an input terminal disposed to receive a data signal from the keyboard unit, a first NAND gate having two input terminals, one of the terminals being disposed to receive an output of the first inverter and the other terminal being disposed to receive the control signal, a second inverter having an input terminal disposed to receive an output of the first NAND gate, and a second NAND gate having two input terminals, one of the terminals being disposed to receive an output of the second inverter and the other terminal being disposed receive the control signal, and a clock control portion electrically connected to shift said second signal line between electrically activated and electrically inactivated states, said clock control portion controlling said second signal line in response to the control signal, said clock control portion comprising:

third and fourth load resistors connected in parallel on said second signal line and supplied with a second source voltage, a third inverter having an input terminal disposed to receive a clock signal from the keyboard unit, a third NAND gate having two input terminals, one of the terminals being disposed to receive an output of the third inverter and the other terminal being disposed to receive the control signal, a fourth inverter having an input terminal disposed to receive an output of the third NAND gate, and a fourth NAND gate having two input terminals, one of the terminals being disposed to receive an output of the fourth inverter and the other terminal being disposed receive the control signal.

2. A computer system with a remote control function, comprising:

a main computer unit;

a keyboard unit electrically connected to said main computer unit by first and second signal lines, said keyboard unit generating a re-send signal when a communication request signal for remote control is provided from said main computer unit;

a remote control receiver mounted on said keyboard unit, for generating a control signal upon detection of the re-send signal from said keyboard unit to said main computer unit; and a communication control unit coupled between said keyboard unit and said main computer unit through said first and second signal lines, for blocking communication of said keyboard unit with said main computer unit in response to the control signal to allow said remote control receiver to receive information from said main computer unit for redefining a key function for remote control.

3. The computer system of claim 2, wherein said communication control unit comprises:

a data control portion disposed to control said first signal line to be activated and inactivated in response to the control signal, said data control portion comprising first and second load resistors connected in parallel on said first signal line and supplied with a first source voltage, a first inverter having an input terminal disposed to receive a data signal from the keyboard unit, a first NAND gate having two input terminals, one of the terminals being disposed to receive an output of the first inverter and the other terminal being disposed to receive the control signal, a second inverter having an input terminal disposed to receive an output of the first NAND gate, and a second NAND gate having two input terminals, one of the terminals being disposed to receive an output of the second inverter and the other terminal being disposed receive the control signal; and a clock control portion disposed to control said second signal line to be activated and inactivated in response to the control signal, said clock control portion comprising third and fourth load resistors connected in parallel on said second signal line and supplied with a second source voltage, a third inverter having an input terminal disposed to receive a clock signal from the keyboard unit, a third NAND gate having two input terminals, one of the terminals being disposed to receive an output of the third inverter and the other terminal being disposed to receive the control signal, a fourth inverter having an input terminal disposed to receive an output of the third NAND gate, and a fourth NAND gate having two input terminals, one of the terminals being disposed to receive an output of the fourth inverter and the other terminal being disposed receive the control signal.

4. The computer system of claim 2, wherein said communication control unit comprises a data control portion disposed to control said first signal line to be activated and inactivated in response to the control signal.

5. The computer system of claim 4, wherein said data control portion comprises:

first and second load resistors connected in parallel on said first signal line and supplied with a first source voltage, a first inverter having an input terminal disposed to receive a data signal from said keyboard unit, a first NAND gate having two input terminals, one of the terminals being disposed to receive an output of the first inverter and the other terminal being disposed to receive the control signal, a second inverter having an input terminal disposed to receive an output of the first NAND gate; and a second NAND gate having two input terminals, one of the terminals being disposed to receive an output of the second inverter and the other terminal being disposed receive the control signal.

6. The computer system of claim 2, wherein said communication control unit comprises a clock control portion disposed to control said second signal line to be activated and inactivated in response to the control signal.

7. The computer system of claim 6, wherein said clock control portion comprises:

first and second load resistors connected in parallel on said second signal line and supplied with a first source voltage, a first inverter having an input terminal disposed to receive a clock signal from said keyboard unit, a first NAND gate having two input terminals, one of the terminals being disposed to receive an output of the first inverter and the other terminal being disposed to receive the control signal, a second inverter having an input terminal disposed to receive an output of the first NAND gate; and a second NAND gate having two input terminals, one of the terminals being disposed to receive an output of the second inverter and the other terminal being disposed receive the control signal.

8. The computer system of claim 2, wherein said communication control unit comprises:

a data control portion disposed to control said first signal line to be activated and inactivated in response to the control signal; and a clock control portion disposed to control said second signal line to be activated and inactivated in response to the control signal.

9. A method of redefining a key function for remote control in a computer system comprising a main computer unit, a keyboard unit electrically connected to said main computer unit, a remote control receiver mounted on said keyboard unit, and a communication control unit coupled between said keyboard unit and said main computer unit, said method comprising the steps of:

generating a communication request signal for remote control from said main computer unit during a communication with said keyboard unit;

generating a re-send signal from said keyboard unit in response to the communication request signal;

generating a control signal from said remote control receiver mounted on said keyboard unit upon detection of the re-send signal;

intercepting communication of said keyboard unit with said main computer unit by said communication control unit coupled between said keyboard unit and said main computer unit in response to the control signal; and allowing said remote control receiver to communicate with said main computer unit for redefining said key function for remote control.

10. The method of claim 9, further comprising the step of performing a redefining routine for redefining said key function for remote control.

11. The method of claim 10, wherein the step of performing a redefining routine further comprises the steps of:

checking whether a first key-input from a remote control transmitter in wireless communication with said remote control receiver mounted on said keyboard unit, is applied through said remote control receiver to said main computer unit;

calling a remote control program in said main computer unit, when the first key-input from said remote control transmitter is applied through said remote control receiver to said main computer unit;

transmitting a key map to said main computer unit, when the first key-input from said remote control transmitter is not applied through said remote control receiver to said main computer unit;

checking whether a reset signal is applied from said remote control transmitter;

resetting a key map value for the key function, when the reset signal is applied from said remote control transmitter;

setting the key map value for the key function to an initial value, when the reset signal is not applied from said remote control transmitter; and intercepting the communication of said remote control receiver with said main computer unit.

12. The method of claim 11, wherein the step of resetting a key map value for the key function comprises the steps of:

checking whether the new key map is to be set;

calling a redefining program of the new key map, when the new key map is to be set;

selecting a first key map from a list of previously defined key maps;

transmitting the first key map to said remote control receiver, when the new key map is not set; and checking whether the first key map is correct.

13. The method of claim 11, wherein the step of resetting a key map value for the key function comprises the steps of:

checking whether the new key map is to be set;

calling a redefining program of the new key map, when the new key map is to be set;

selecting a first key map from a list of previously defined key maps;

transmitting the first key map to said remote control receiver; and checking whether the first key map is correct.

14. The method of claim 13, wherein the step of resetting a key map value for the key function further comprises the step of:

selecting a second key map from the list of previously defined key maps when the first key map is not correct.

15. The method of claim 14, wherein the step of intercepting the communication of said remote control receiver with said main computer unit occurs when the first key map is correct.

16. The method of claim 15, wherein the step of intercepting the communication of said remote control receiver with said main computer unit occurs after the step of setting the key map value for the key function to the initial value, when the reset signal is not applied from said remote control transmitter in wireless communication with said remote control receiver mounted on said keyboard unit.

17. A computer system, comprising:

a main computer unit;

a keyboard unit electrically connected to said main computer unit by a cable for communication with said main computer unit, said keyboard unit generating a re-send signal when a communication request signal for remote control generated from said main computer unit is not recognized by said keyboard unit;

a remote control receiver mounted on said keyboard unit and electrically connected to said main computer unit for communication with said main computer unit via said cable, said remote control receiver generating a control signal upon detection of the re-send signal from said keyboard unit to said main computer unit; and a communication control unit electrically coupled between said keyboard unit and said main computer unit via said cable, for blocking wire communication of said keyboard unit with said main computer unit in response to said control signal to permit wireless communication between a remote control transmitter and said main computer unit using said remote control receiver.

18. The computer system of claim 17, wherein said communication control unit comprises:

a data control portion electrically disposed to activate and deactivate a data line of said cable for communication between said keyboard unit and said main computer unit in response to said control signal; and a clock control portion electrically disposed to activate and deactivate a clock line of said cable for communication between said keyboard unit and said main computer unit in response to said control signal.

19. The computer system of claim 18, wherein said data control portion comprises:

first and second load resistors connected in parallel on said signal line of said cable and supplied with a first source voltage;

a first inverter having an input terminal disposed to receive a data signal from said keyboard unit;

a first NAND gate having a first input terminal disposed to receive an output of the first inverter and a second input terminal disposed to receive said control signal;

a second inverter having an input terminal disposed to receive an output of the first NAND gate; and a second NAND gate having a first input terminal disposed to receive an output of said second inverter and a second input terminal disposed receive said control signal.

20. The computer system of claim 18, wherein said clock control portion comprises:

first and second load resistors connected in parallel on said clock line of said cable and supplied with a first source voltage;

a first inverter having an input terminal disposed to receive a clock signal from said keyboard unit;

a first NAND gate having a first input terminal disposed to receive an output of said first inverter and a second input terminal disposed to receive said control signal, a second inverter having an input terminal disposed to receive an output of said first NAND gate; and a second NAND gate having a first input terminal disposed to receive an output of said second inverter and a second input terminal disposed receive said control signal.

* * * * *